(12) United States Patent (10) Patent No.: US 8,797,749 B2
Nakajima (45) Date of Patent: Aug. 5, 2014

(54) ELECTRONIC APPARATUS INCLUDING BUMPER PORTION PROTECTING HOUSING

(75) Inventor: Yuji Nakajima, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 11 days.

(21) Appl. No.: 13/328,373

(22) Filed: Dec. 16, 2011

(65) Prior Publication Data

US 2012/0250276 A1 Oct. 4, 2012

(30) Foreign Application Priority Data

Mar. 31, 2011 (JP) ................................. 2011-080381

(51) Int. Cl.
*H05K 5/00* (2006.01)
*G06F 1/16* (2006.01)

(52) U.S. Cl.
CPC ............ *G06F 1/1656* (2013.01); *G06F 1/1626* (2013.01); *G06F 1/1658* (2013.01)
USPC ............................ 361/752; 361/807; 361/810

(58) Field of Classification Search
USPC .......................................... 361/752, 807, 810
See application file for complete search history.

(56) References Cited

U.S. PATENT DOCUMENTS

| 4,894,295 | A | 1/1990 | Cheiky |
| 8,014,139 | B2 | 9/2011 | Maeda et al. |
| 2009/0103257 | A1* | 4/2009 | Maeda et al. ............ 361/679.27 |

FOREIGN PATENT DOCUMENTS

| JP | 08-234671 | | 9/1996 |
| JP | 11-270625 | A2 | 10/1999 |
| JP | 11-284363 | A2 | 10/1999 |
| JP | 2000-106297 | | 4/2000 |
| JP | 2000-181370 | | 6/2000 |
| JP | 2003-051681 | | 2/2003 |
| JP | 2006-235092 | | 9/2006 |
| JP | 2007-249127 | | 9/2007 |
| JP | 2009-099064 | A2 | 5/2009 |
| JP | 2009-237177 | A2 | 10/2009 |
| WO | WO 2008/018232 | | 2/2008 |

OTHER PUBLICATIONS

Office Action received in Japanese Patent Application No. 2011-080381, dated Mar. 6, 2012, in 8 pages.
Office Action received in Japanese Patent Application No. 2011-080381, dated Jul. 17, 2012, in 6 pages.

* cited by examiner

*Primary Examiner* — Andargie M Aychillhum
(74) *Attorney, Agent, or Firm* — Knobbe Martens Olson & Bear LLP

(57) ABSTRACT

According to one embodiment, an electronic apparatus includes a housing, a frame, a display module, and a printed circuit board. The housing includes a first panel and a second panel at the back of the first panel. The frame is contained in the housing and located between the first panel and the second panel. At least part of the frame is provided with a bumper portion. The bumper portion is configured to protrude to the outside of the housing. The display module is contained in the housing, and includes a display screen covered with the first panel. The printed circuit board is contained in the housing.

6 Claims, 8 Drawing Sheets

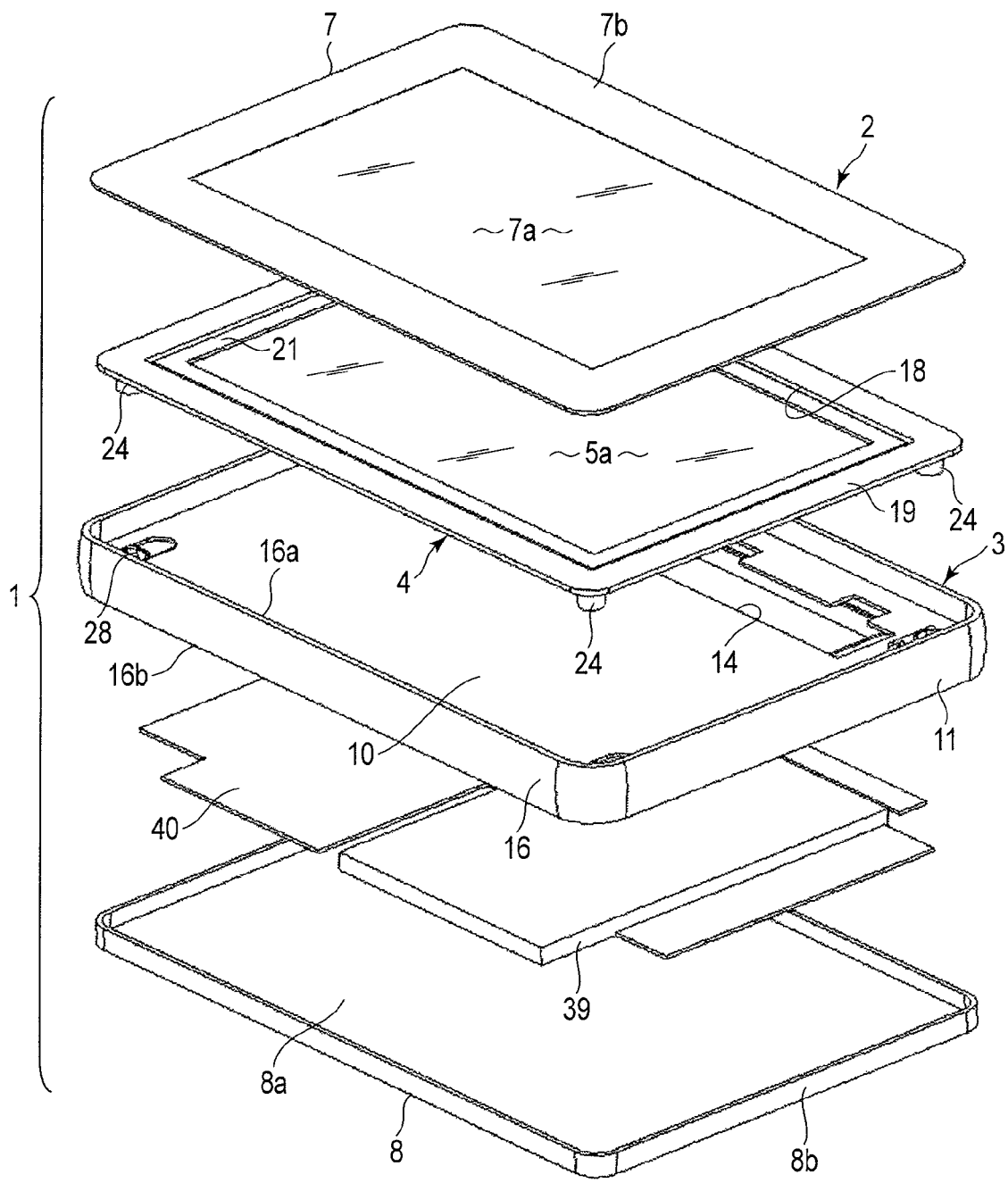
F I G. 2

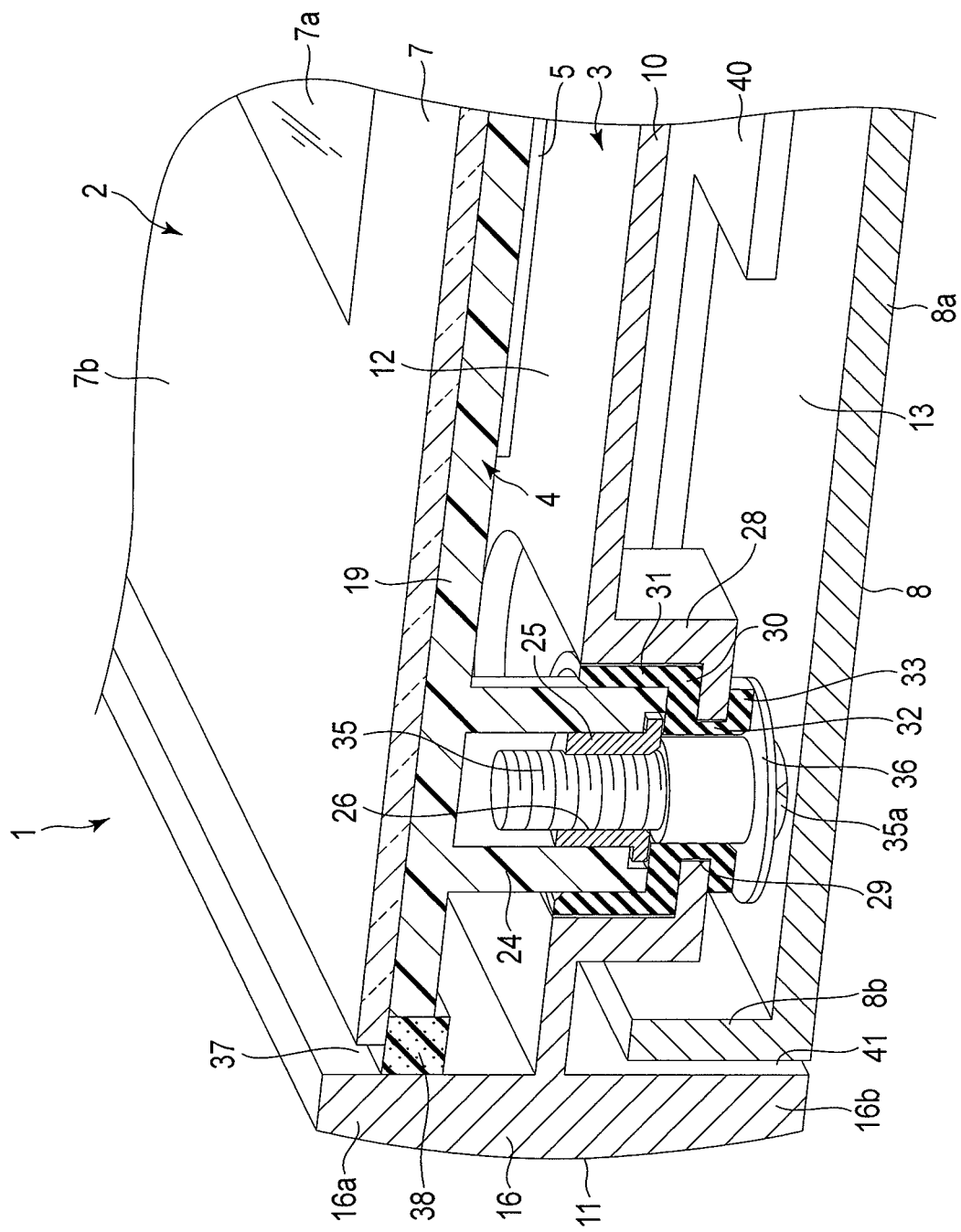
F I G. 5

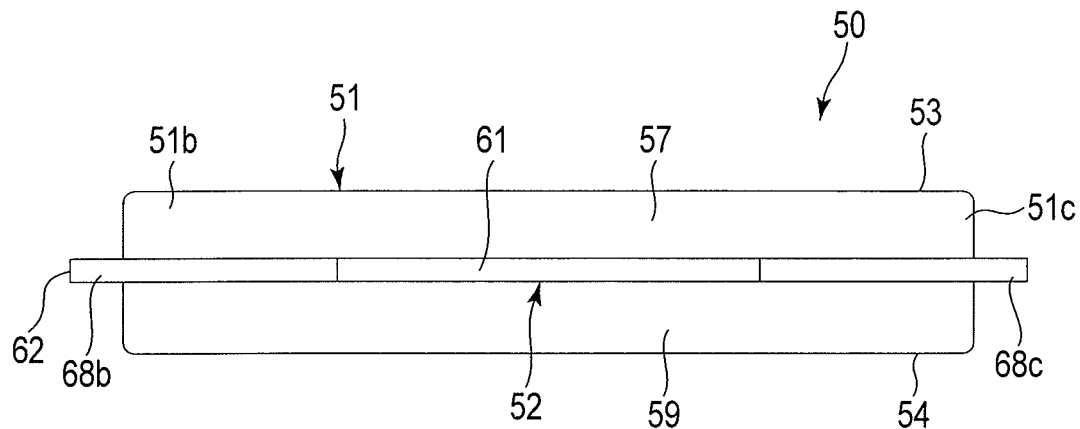
F I G. 7
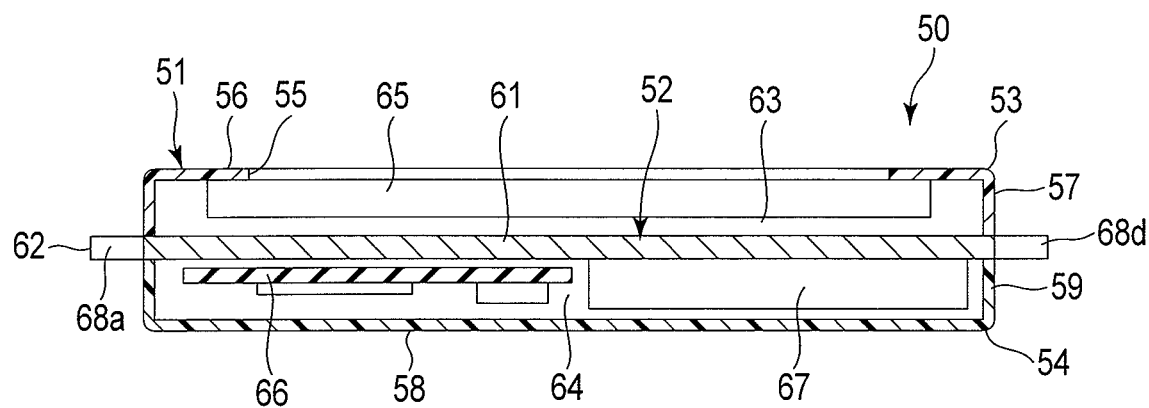
F I G. 8

ELECTRONIC APPARATUS INCLUDING BUMPER PORTION PROTECTING HOUSING

CROSS-REFERENCE TO RELATED APPLICATIONS

This application is based upon and claims the benefit of priority from prior Japanese Patent Application No. 2011-080381, filed Mar. 31, 2011, the entire contents of which are incorporated herein by reference.

FIELD

Embodiments described herein relate generally to an electronic apparatus comprising a touch panel type display module.

BACKGROUND

A tablet computer comprises a transparent protection plate which covers a touch panel. The protection plate is entirely exposed at the surface of the tablet computer. The protection plate is made of fragile glass or sensitive plastic. Therefore, when a user accidentally drops the tablet computer on the floor, the protection plate is likely to be damaged by shock imparted to the tablet computer.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary exploded perspective view of the tablet computer according to the first embodiment;

FIG. 5 is an exemplary perspective view of the tablet computer, which shows in section a structure of a portion where an LCD support is elastically supported by a frame in the first embodiment;

FIG. 7 is an exemplary side view of the tablet computer according to the second embodiment;

FIG. 8 is an exemplary cross-sectional view taken along line F8-F8 in FIG. 6;

DETAILED DESCRIPTION

Various embodiments will be described hereinafter with reference to the accompanying drawings. In general, according to one embodiment, an electronic apparatus comprises a housing, a frame, a display module and a printed circuit board. The housing comprises a first panel and a second panel located at the back of the first panel. The frame is contained in the housing and located between the first panel and the second panel. At least part of the frame is provided with a bumper portion. The bumper portion is configured to protrude to the outside of the housing. The display module is contained in the housing, and comprises a display screen covered with the first panel. The printed circuit board is contained in the housing.

First Embodiment

Referring to FIGS. 1 to 5, a first embodiment will be described below.

Figure 1:
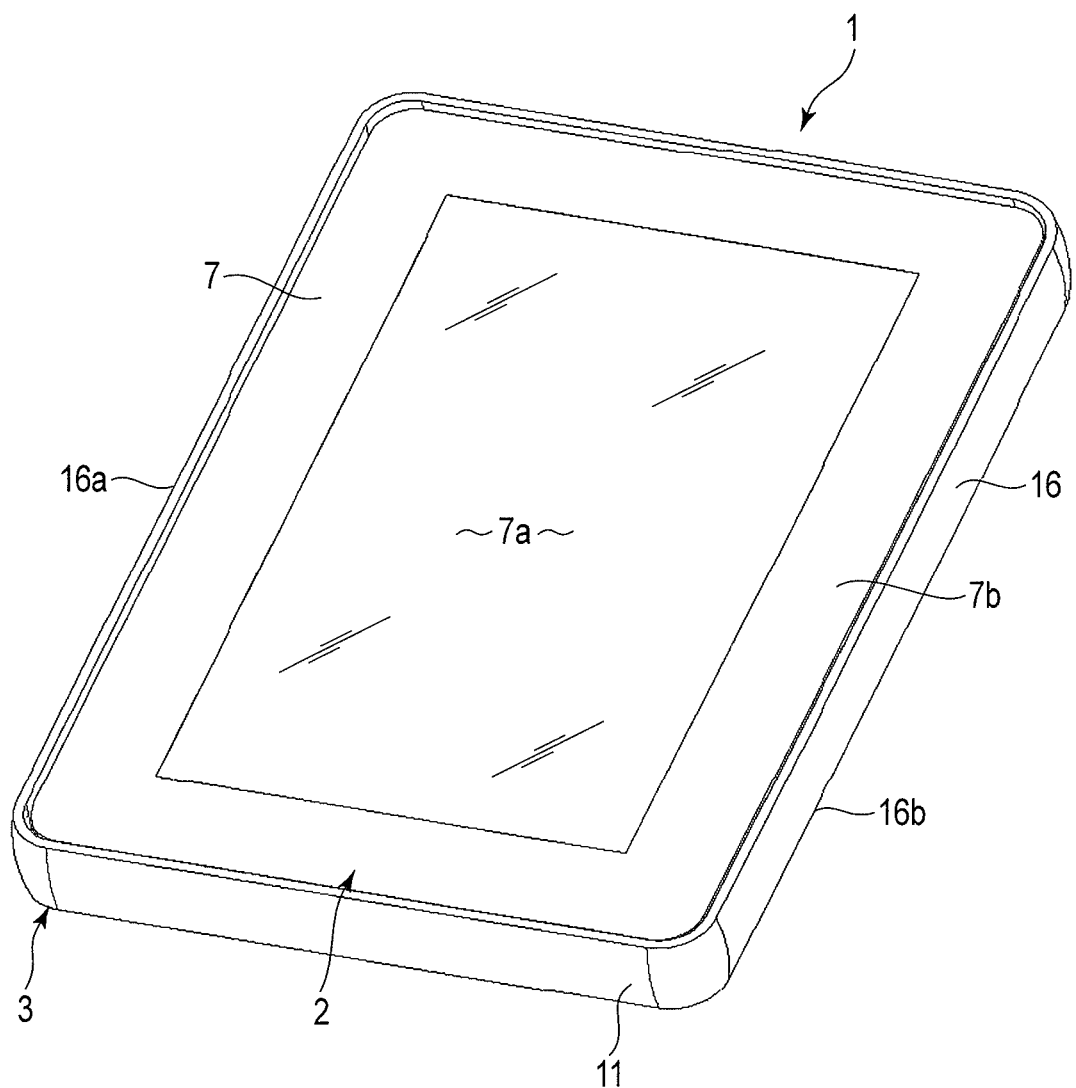
FIG. 1 is an exemplary perspective view of a tablet computer according to a first embodiment.
Figure 3:
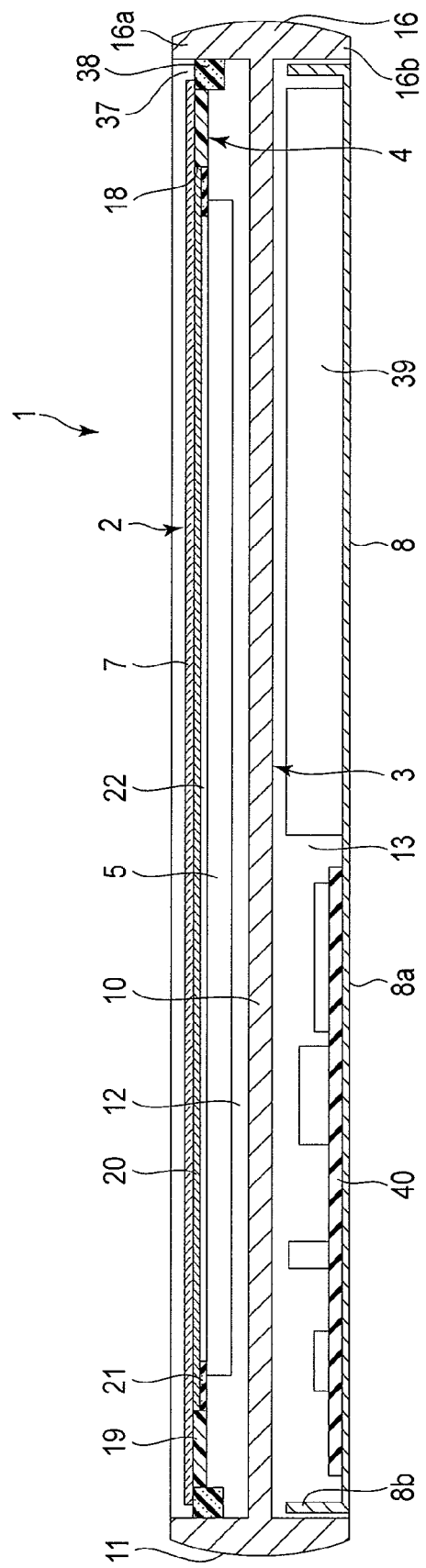
FIG. 3 is an exemplary cross-sectional view of the tablet computer according to the first embodiment.

FIGS. 1 to 3 disclose a tablet computer 1. The tablet computer 1 is an example of the electronic apparatus, and has a size which, for example, allows a user to use the tablet computer 1 while holding it with one hand.

The tablet computer 1 comprises, as main structural elements, a housing 2, a frame 3, an LCD support 4, and a display module 5. The housing 2 is an example of an exterior member forming the shell of the tablet computer 1. Namely, the exterior member is a first member forming part of the tablet computer 1.

The housing 2 comprises a protection plate 7 and a base 8. The protection plate 7 is an example of a first panel or a first wall, and is made of a translucent material, such as glass or plastic. The protection plate 7 comprises a rectangular transparent display area 7a, and an opaque mask portion 7b surrounding the display area 7a. The display area 7a and the mask portion 7b are flush with each other to form a first surface entirely exposed to the outside of the housing 2.

The base 8 is made of a metal, such as an aluminum alloy or a magnesium alloy, and forms the bottom of the housing 2. The base 8 is an example of a second panel or a second wall, and comprises a rectangular bottom plate 8a and a flange portion 8b standing on a peripheral portion of the bottom plate 8a. The bottom plate 8a and the flange portion 8b are integrated into one body so that the base 8 takes a bathtub form and has a seamless three-dimensional structure. The back surface of the bottom plate 8a forms a second surface entirely exposed to the outside of the housing 2.

The protection plate 8 and the base 8 are located in parallel with an interval interposed therebetween in a thickness direction of the housing 2. Therefore, the base 8 is located on the back of the protection plate 7 in the housing 2.

The frame 3 is an example of an intermediate member, and is provided between the protection plate 7 and the base 8. The intermediate member is a second member forming the tablet computer 1 together with the housing 2. The frame 3 is made of a metal, such as an aluminum alloy or a magnesium alloy, or a high-stiffness resin, and is strong. The high-stiffness resin is, for example, a fiber-reinforced resin made by adding an additive, such as a glass fiber, a carbon fiber, another reinforced fiber, or talc to a resin. In the first embodiment, Young's modulus of the high-stiffness resin is 4000 MPa or more.

As shown in FIG. 2, the frame 3 is an integral structure comprising a mounting portion 10 and a bumper portion 11. The mounting portion 10 is formed of a rectangular plate interposed between the protection plate 7 and the bottom plate 8a of the base 8. A first mounting space 12 is provided between the mounting portion 10 and the protection plate 7. A second mounting space 13 is provided between the mounting portion 10 and the bottom plate 8a of the base 8. The first mounting space 12 communicates with the second mounting space 13 through a via hole 14 formed for wiring in the mounting portion 10.

The mounting portion 10 of the frame 3 need not be a plate, and may be, for example, a grid of a plurality of vertical bars and a plurality of horizontal bars. In the case of the grid, the first mounting space 12 communicates with the second mounting space 13 through a plurality of voids defined by the vertical bars and horizontal bars. The existence of voids offers a weight reduction of the frame 3.

The bumper portion 11 is formed integrally with the peripheral portion of the mounting portion 10 to entirely surround the mounting portion 10. The bumper portion 11 is an example of a protruding portion, and is a part of the frame 3 or an outer peripheral part of the frame 3.

The bumper portion 11 comprises a shell wall 16. The shell wall 16 protrudes to the outside of the housing 2 to surround the peripheral portion of the protection plate 7 and the peripheral portion of the bottom plate 8a. Further, the shell wall 16 comprises a first edge portion 16a and a second edge portion 16b. The first edge portion 16a entirely surrounds the protection plate 7, and is slightly protrudes in a thickness direction of the tablet computer 1 from the mask portion 7b of the protection plate 7. The second edge 16b is opposite to the first edge portion 16a, and entirely surrounds the flange portion 8b of the base 8. The second edge portion 16b is flush with the back surface of the bottom plate 8a of the base 8, or slightly protrudes in a thickness direction of the tablet computer 1 from the back surface of the bottom plate 8a.

Therefore, the shell wall 16 of the bumper portion 11 is entirely exposed to the outside of the tablet computer 1 to form the outline of the tablet computer 1.

The LCD support 4 is an example of a support member, and is made of, for example, a synthetic resin material. As best shown in FIG. 2, the LCD support 4 comprises a frame portion 19 defining a rectangular opening 18. The frame portion 19 is interposed between the protection plate 7 and the mounting portion 10 of the frame 3, and is surrounded by the shell wall 16 of the bumper portion 11.

Figure 4:
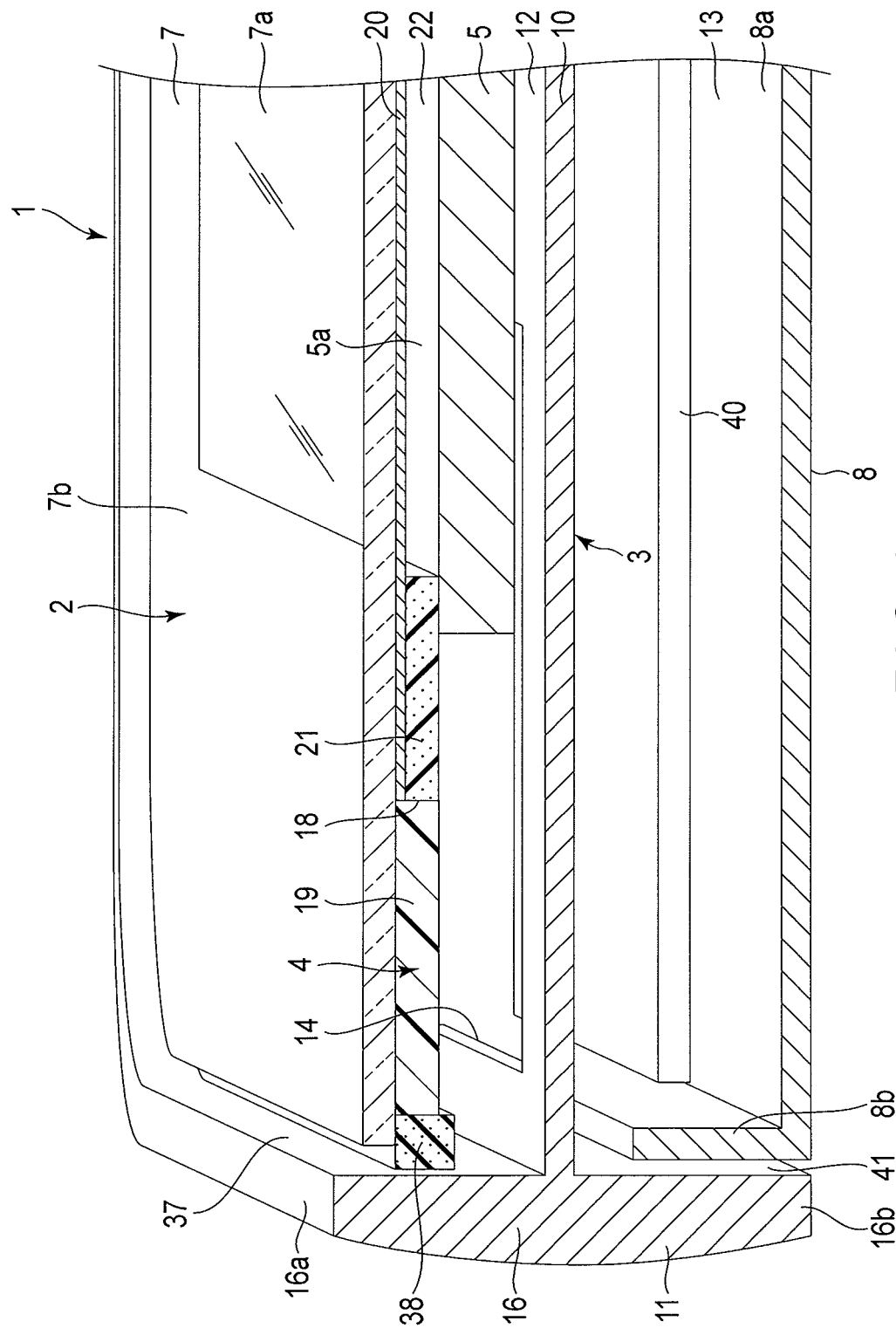
FIG. 4 is an exemplary perspective view partly showing in section an inner structure of the tablet computer according to the first embodiment.

As shown in FIGS. 3 to 5, the mask portion 7b of the protection plate 7 is fixed on the frame portion 19 by, for example, bonding. Therefore, the display area 7a of the protection plate 7 faces the opening 18 of the LCD support 4.

Furthermore, in the first embodiment, a touch panel 20 having a handwritten input function is fixed to the back surface of the display area 7a of the protection plate 7 by, for example, bonding. The touch panel 20 is surrounded by the frame portion 19 of the LCD support 4.

As shown in FIG. 3, the display module 5 is contained in the first mounting space 12. The display module 5 is fixed to the frame portion 19 of the LCD support 4 by, for example, bonding. The display module 5 comprises a rectangular display screen 5a configured to display images. The display screen 5a faces the back surface of the touch panel 20 through the opening 18 of the LCD support 4.

A spacer 21 is interposed between a peripheral portion of the back surface of the touch panel 20 and a peripheral portion of the display module 5. The spacer 21 forms a gap 22 for preventing moire between the display screen 5a and the touch panel 20.

The LCD support 4 to which the display module 5 and the protection plate 7 are fixed is supported by the mounting portion 10 of the frame 3 in a floating manner. More specifically, as shown in FIGS. 2 and 5, a plurality of hollow cylindrical bosses 24 are formed integrally with the frame portion 19 of the LCD support 4. The bosses 24 protrude to the mounting portion 10 of the frame 3 from four corners of the frame portion 19, respectively. An internal thread member 25 is integrally buried in a protrusion end of each boss 24. The internal thread member 25 defines a screw hole 26 in the boss 24.

As shown in FIG. 5, the mounting portion 10 of the frame 3 comprises a recess 28 corresponding to the boss 24. The recess 28 is located in each of the four corners of the mounting portion 10. A via hole 29 is formed in the bottom of the recess 28. The via hole 29 is in alignment with the screw hole 26.

A tip of the boss 24 is coaxially inserted in the recess 28. A vibration isolation member 30 is interposed between the outer peripheral surface of the boss 24 and the inner peripheral surface of the recess 28. The vibration isolation member 30 is formed of, for example, a soft rubber elastic member. The vibration isolation member 30 comprises a first cylinder 31, a second cylinder 32 and a flange portion 33, which are formed integrally with one another.

The first cylinder 31 is interposed between the tip of the boss 24 and the inner surface of the recess 28. The second cylinder 32 is continuous with the bottom of the first cylinder 31, and is located in the via hole 29. The flange portion 33 protrudes to the outside of the recess 28 from the open end of the second cylinder 32.

As shown in FIG. 5, a fixing screw 35 is inserted in the vibration isolation member 30. The fixing screw 35 is screwed into the screw hole 26 of the boss 24 through the second cylinder 32 of the vibration isolation member 30 from under the frame 3. A washer 36 attached to the fixing screw 35 is interposed between a head 35a of the fixing screw 35 and the flange portion 33 of the vibration isolation member 30. Therefore, the LCD support 4 is elastically displacably supported by the mounting portion 10 of the frame 3 via the vibration isolation member 30.

In the first embodiment, the LCD support 4 is surrounded by the shell wall 16 of the frame 3. The shell wall 16 is apart from the peripheral portion of the protection plate 7 and the outer peripheral portion of the frame portion 19 of the LCD support 4. Namely, a first gap 37 is formed between the shell wall 16 and the peripheral portion of the protection plate 7, and between the shell wall 16 and the outer peripheral portion of the frame portion 19. Therefore, the protection plate 7 and the LCD support 4 are enclosed by the shell wall 16 without coming into contact with the shell wall 16.

A sponge seal member 38 is bonded to the outer periphery of the frame portion 19. The seal member 38 comes into contact with the inner surface of the shell wall 16 to fill the first gap 37.

The bottom plate 8a of the base 8 is fixed to the mounting portion 10 of the frame 3 via a plurality of fixing screws (not shown). A battery 39 and a printed circuit board 40 are contained in the second mounting space 13 between the base 8 and the mounting portion 10 of the frame 3.

Further, a second gap 41 is formed between the shell wall 16 of the frame 3 and the flange portion 8b of the base 8. Therefore, the base 8 is enclosed by the shell wall 16 without coming into contact with the shell wall 16.

In the first embodiment, the strong frame 3 supporting the LCD support 4 comprises the bumper portion 11 surrounding the display module 5 and the protection plate 7. The shell wall 16 of the bumper portion 11 is entirely exposed to the outside of the tablet computer 1 to form the outline of the tablet computer 1.

Therefore, when a user accidentally drops the tablet computer 1 on the floor while operating the tablet computer 1 in one hand, the bumper portion 11 of the strong frame 3 receives a shock caused by the drop.

More specifically, when a user drops the tablet computer 1 on the floor, the tablet computer 1 is more likely to drop with a corner of the tablet computer 1 pointing down, than dropping in a horizontal attitude where the protection plate 7 faces upward or downward. Therefore, there is a high possibility that the shell wall 16 of the bumper portion 11 forming the outline of the tablet computer 1 first strikes the floor.

In the first embodiment in particular, the first edge portion 16a of the shell wall 16 protrudes in the thickness direction of the tablet computer 1 from the display area 7a and mask portion 7b of the fragile protection plate 7. Therefore, there is a much more possibility that the first edge portion 16a of the shell wall 16 strikes the floor.

Consequently, even if the tablet computer 1 is dropped on the floor, the protection plate 7 exposed on the top surface of the tablet computer 1 can be prevented from directly striking the floor, and damage to the protection plate 7 can be prevented.

In addition, the LCD support 4 to which the display module 5 and protection plate 7 are fixed is elastically supported by the mounting portion 10 of the frame 3 via the vibration isolation member 30. Therefore, when the bumper portion 11 of the frame 3 strikes the floor, the shock conveyed from the bumper portion 11 to the LCD support 4 via the mounting portion 10 is absorbed by the vibration isolation member 30 interposed between the mounting portion 10 and the LCD support 4. Namely, the vibration isolation member 30 is deformed to absorb the shock received by the bumper portion 11, thereby reducing the shock conveyed from the frame 3 to the LCD support 4.

Moreover, the shell wall 16 of the bumper portion 11 is separated from the peripheral portion of the mounting portion 10 of the LCD support 4 by the existence of the first gap 37. Therefore, the shock received by the bumper portion 11 can be prevented from directly being conveyed from the shell wall 16 to the mounting portion 10 of the LCD support 4.

As a result, the shock caused by the drop of the tablet computer 1 can be prevented from being directly conveyed to the display module 5 and protection plate 7 fixed to the LCD support 4. Consequently, the display module 5 and protection plate 7 are less likely to be damaged, and the shock resistance of the tablet computer 1 can be increased.

In the first embodiment, the first edge portion 16a of the shell wall 16 of the bumper portion 11 protrudes in the thickness direction of the tablet computer 1 from the protection plate 7, and the second edge portion 16b of the shell wall 16 is flush with the back surface of the bottom plate 8a.

In other words, the shell wall 16 of the strong bumper portion 11 defines the thickness of the tablet computer 1, and thus works against the external force which applies pressure to the tablet computer 1 in the thickness direction. Therefore, even if the tablet computer 1 receives pressure in the thickness direction, application of an excessive force to the display module 5 or protection plate 7 can be prevented.

Second Embodiment

Figure 6:
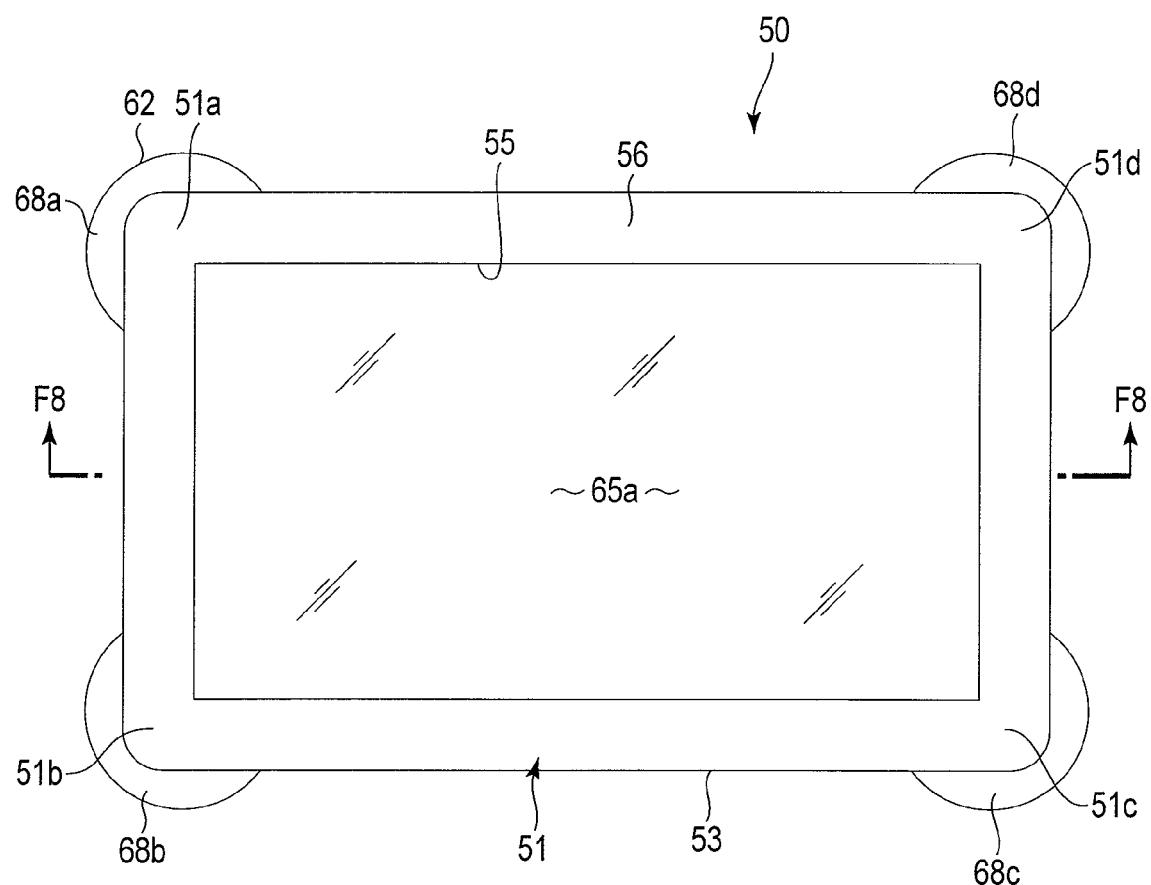
FIG. 6 is an exemplary plan view of a tablet computer according to a second embodiment.

FIGS. 6 to 8 disclose a tablet computer 50 according to a second embodiment.

In the second embodiment, the tablet computer 50 comprises, as main structural elements, a housing 51 and a frame 52. The housing 51 is an example of an exterior member or first member forming the shell of the tablet computer 50, and is made of, for example, a synthetic resin material. The housing 51 comprises a flat rectangular box comprising first to fourth corners 51a, 51b, 51c, 51d, and has a size which allows a user to use the tablet computer 50 while holding it with one hand.

The housing 51 comprises a top cover 53 and a base 54. The top cover 53 is an example of a first panel or a first wall, and comprises a rectangular upper wall 56 provided with an opening 55 and a peripheral wall 57 continuous with a peripheral edge of the upper wall 56. The upper wall 56 forms a first surface entirely exposed to the outside of the housing 51.

The base 54 is an example of a second panel or a second wall, and comprises a rectangular bottom wall 58 and a peripheral wall 59 continuous with a peripheral edge of the bottom wall 58. The bottom wall 58 and the peripheral wall 59 are integrated into one body so that the base 54 takes a bathtub form and has a seamless three-dimensional structure. The back surface of the bottom wall 58 forms a second surface entirely exposed to the outside of the housing 51.

The top cover 53 is coupled to the base 54 in a thickness direction of the housing 51. Accordingly, the base 54 is located at the back of the top cover 53 in the housing 51.

The frame 52 is an example of an intermediate member or a second member, and is interposed between the top cover 53 and the base 54. The frame 52 is made of a strong metallic material, such as an aluminum alloy or a magnesium alloy.

As shown in FIG. 8, the frame 52 is a one body structure comprising a mounting portion 61 and a bumper portion 62. The mounting portion 61 is a rectangular plate, and is configured to separate the top cover 53 from the base 54. A first mounting space 63 is formed between the mounting portion 61 and the top cover 53. A second mounting space 64 is formed between the mounting portion 61 and the base 54.

A display module 65 is contained in the first mounting space 63. The display module 65 is fixed to the mounting portion 61 of the frame 52. The display module 65 comprises a display screen 65a configured to display images. The display screen 65a is exposed to the outside of the housing 51 through the opening 55.

A printed circuit board 66 and a battery 67 are contained in the second mounting space 64. The printed circuit board 66 and battery 67 are fixed to the mounting portion 61 of the frame 52.

As shown in FIG. 6, the bumper portion 62 comprises first to fourth protrusions 68a, 68b, 68c, 68d. The first to fourth protrusions 68a, 68b, 68c, 68d protrude to the outside of the housing 51 from between the peripheral walls 57, 59 at positions corresponding to the first to fourth corners 51a, 51b, 51c, 51d, and each takes an arc form. The first to fourth protrusions 68a, 68b, 68c, 68d are portions of the frame 52 or peripheral portions of the frame 52.

In the second embodiment, the strong frame 52 supporting the display module 65, printed circuit board 66 and battery 67 comprises the first to fourth protrusions 68a, 68b, 68c, 68d. The first to fourth protrusions 68a, 68b, 68c, 68d protrude to the outside of the housing 51 from the first to fourth corners 51a, 51b, 51c, 51d of the housing 51, respectively.

Therefore, when a user accidentally drops the tablet computer 50 on the floor while operating the tablet computer 50 in hand, the first to fourth protrusions 68a, 68b, 68c, 68d of the strong bumper portion 62 are likely to strike the floor first.

Therefore, even if the tablet computer 50 is dropped on the floor, the display screen 65a of the display module 65, which is exposed through the opening 55 of the housing 51, can be prevented from directly striking the floor, and damage to the display screen 65a can be prevented.

In addition, the bumper portion 62 receives and absorbs the shock imparted to the tablet computer 50. Therefore, application of an excessive force to the housing 51 can be prevented, and damage to the housing 51 can be prevented. As a result, the shock resistance of the tablet computer 50 can be increased by use of the frame 52.

Third Embodiment

Figure 9:
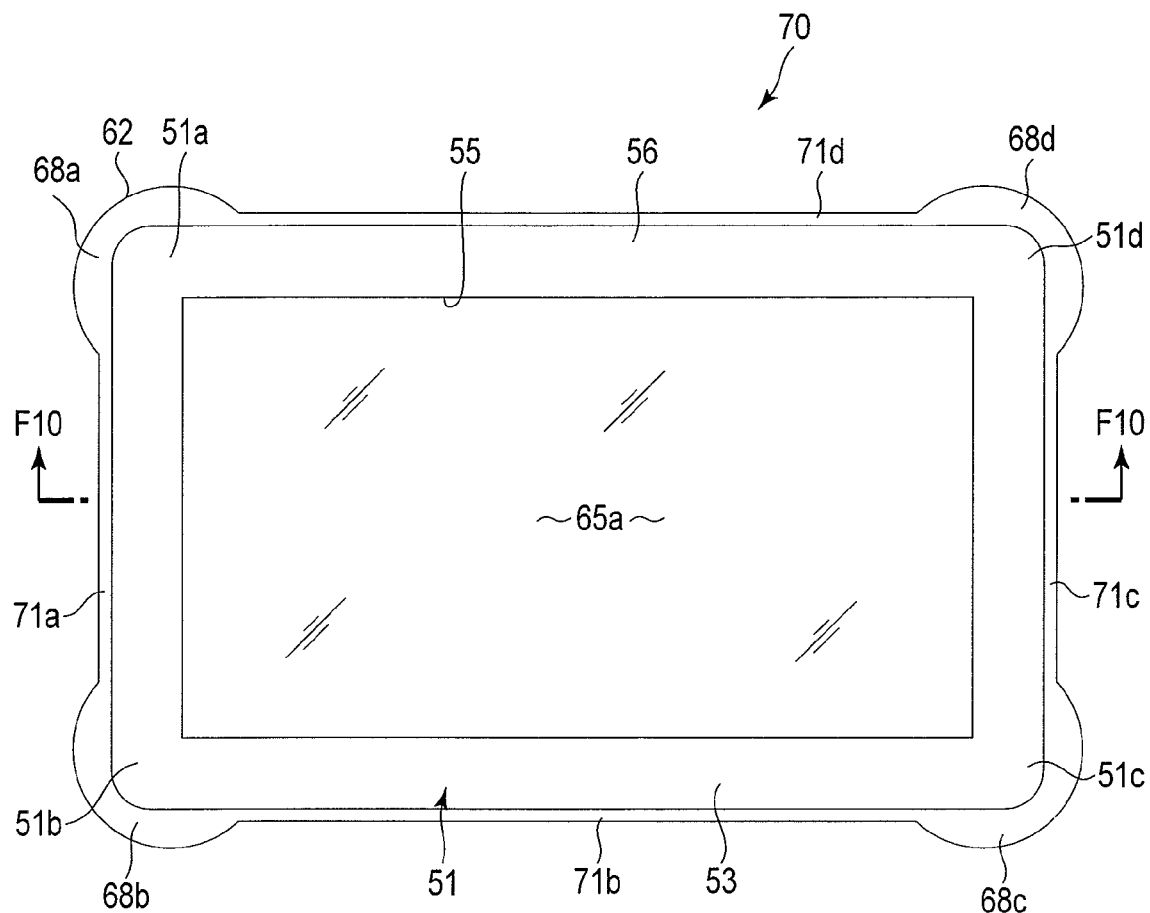
FIG. 9 is an exemplary plan view of a tablet computer according to a third embodiment.
Figure 10:
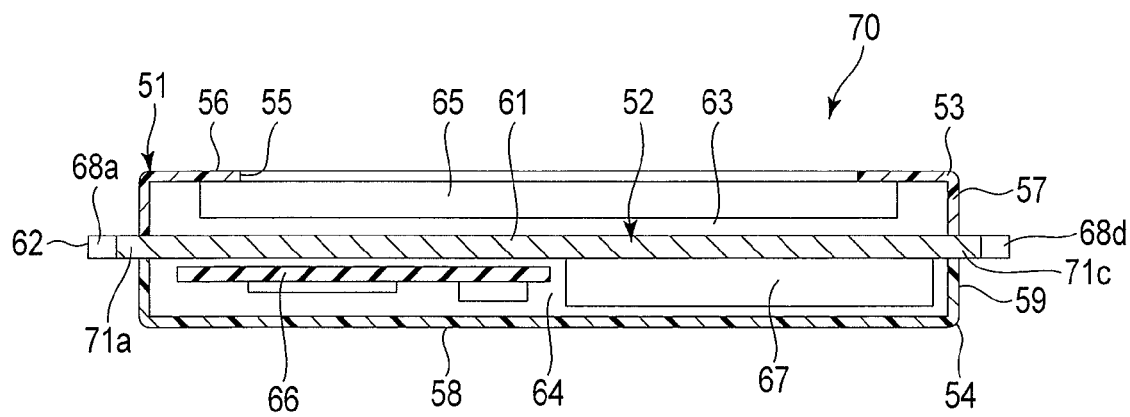
FIG. 10 is an exemplary cross-sectional view taken along line F10-F10 in FIG. 9.

FIGS. 9 and 10 disclose a tablet computer 70 according to a third embodiment.

In the third embodiment, the configurations of the frame 52 and bumper portion 62 are different from those in the second embodiment. Other than those, the configurations of the tablet computer 70 are same as those in the second embodiment. Therefore, in the third embodiment, the same elements as the ones in the second embodiment will be assigned the same reference symbols, and the explanations thereof will be omitted.

As shown in FIGS. 9 and 10, the bumper portion 62 of the frame 52 comprises first to fourth peripheral portions 71a, 71b, 71c, 71d protruding to the outside of the housing 51 from between the peripheral walls 57, 59 of the housing 51.

The first peripheral portion 71a linearly connects the first protrusion 68a to the second protrusion 68b. The second peripheral portion 71b linearly connects the second protrusion 68b to the third protrusion 68c. The third peripheral portion 71c linearly connects the third protrusion 68c to the fourth protrusion 68d. The fourth peripheral portion 71d linearly connects the fourth protrusion 68d to the first protrusion 68a.

Therefore, the first to fourth peripheral portions 71a, 71b, 71c, 71d entirely surround the housing 51 together with the first to fourth protrusions 68a, 68b, 68c, 68d.

In the third embodiment, a shock caused when the tablet computer 70 is accidentally dropped on the floor can be received by the bumper portion 62 of the strong frame 52. In addition, the bumper portion 62 of the frame 52 comprises the first to fourth peripheral portions 71a, 71b, 71c, 71d protruding to the outside of the peripheral walls 57, 59 of the housing 51 to connect the first to fourth protrusions 68a, 68b, 68c, 68d with each other. Therefore, the first to fourth peripheral portions 71a, 71b, 71c, 71d function as a protector for protecting the peripheral walls 57, 59 of the housing 51.

Consequently, the entire periphery of the housing 51 can be protected from shock, and the shock resistance of the tablet computer 70 can be increased.

In the first to third embodiment, a tablet computer has been described as an example of the electronic apparatus. However, the electronic apparatus is not limited to the tablet computer. The electronic apparatus may be, for example, a notebook computer comprising a computer main body including a keyboard, and a display device rotatably supported by the computer main body.

Specifically, the notebook computer comprises a first housing, which is a shell of the computer main body, and a second housing, which is a shell of the display device. A first frame which supports main structural elements, such as a motherboard and a hard disk drive is contained in the first housing. Further, a second frame supporting the display panel is contained in the second housing.

By forming at least part of the first frame to protrude to the outside of the first housing, the first frame can be used as the bumper portion. Similarly, by forming at least part of the second frame to protrude to the outside of the second housing, the second frame can be used as the bumper portion.

In addition, the electronic apparatus is not limited to a tablet or notebook computer. For example, the electronic apparatus may be wide variety of electronic apparatuses, such as a cellular phone, a smartphone, a personal digital assistant (PDA) or a portable video game console.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a housing comprising a first panel, and a second panel at a back of the first panel, the first panel including a first surface exposed to outside of the housing, the second panel having a second surface exposed to the outside of the housing;
    a frame in the housing and located between the first panel and the second panel;
    a bumper portion provided at the frame, the bumper portion surrounding the housing and also protruding from the housing to the outside thereof more outwardly than a peripheral portion of the first panel and a peripheral portion of the second panel;
    a support to which the first panel is attached, the support being elastically supported by the frame, with a vibration isolation member interposed between the support and the frame;
    a display module supported by the frame, the display module comprising a display screen covered by the first panel; and
    a printed circuit board provided between the second panel and the frame,
    wherein the bumper portion includes a first edge portion and a second edge portion, the first edge portion surrounding the first surface of the first panel and also protruding from the housing to the outside of the housing more outwardly than the first surface, the second edge portion surrounding the second panel, and
    wherein the peripheral portion of the first panel and the support are located apart from the bumper portion, and a seal member is interposed between the support and the bumper portion, the seal member being exposed to the outside of the housing from a gap between the peripheral portion of the first panel and the bumper portion.

2. The electronic apparatus of claim 1, wherein the seal member is fixed to a peripheral portion of the support in such a way as to contact the bumper portion.

3. An electronic apparatus comprising:
    an exterior member comprising a first wall and a second wall located opposite to the first wall in a thickness direction of the exterior member, the first wall including a first surface exposed to outside of the exterior member, the second wall including a second surface exposed to the outside of the exterior member;
    an intermediate member located between the first wall and the second wall;
    a protrusion on the intermediate member, the protrusion protruding from the exterior member to the outside thereof more outwardly than a peripheral portion of the first wall and a peripheral portion of the second wall;
    a support to which the first wall is attached, the support being elastically supported by the intermediate member, with a vibration isolation member interposed by the support and the intermediate member; and
    a module supported by the support,
    wherein the protrusion includes a first edge portion and a second edge portion, the first edge portion protruding from the exterior member to the outside thereof more outwardly than the first surface, the second edge portion surrounding the second wall, and the protrusion surrounding the first wall and the second wall, and the peripheral portion of the first wall and the support are located apart from the protrusion, and a seal member is interposed between the support and the protrusion, the seal member being exposed to the outside of the exterior member from a gap between the peripheral portion of the first panel and the protrusion.

4. The electronic apparatus of claim 3, wherein the protrusion comprises a shell wall surrounding both the peripheral portion of the first wall and the peripheral portion of the second wall.

5. The electronic apparatus of claim 4, wherein the seal member is fixed to a peripheral portion of the support in such a way as to contact the shell wall.

6. The electronic apparatus of claim 3, wherein a portion of the intermediate member outside of the exterior member comprises a bumper portion configured to protect the exterior member and the module from shock.

* * * * *